Patented Dec. 13, 1932

1,890,913

UNITED STATES PATENT OFFICE

WILLIAM B. NEWKIRK, OF WESTERN SPRINGS, ILLINOIS, ASSIGNOR TO INTERNATIONAL PATENTS DEVELOPMENT COMPANY, OF WILMINGTON, DELAWARE, A CORPORATION OF DELAWARE

MANUFACTURE OF HYDROUS DEXTROSE FROM HIGH PURITY SOLUTIONS

No Drawing. Application filed November 14, 1929. Serial No. 407,285.

This invention relates to the manufacture from starch converted dextrose solutions of dextrose or grape sugar particularly a high purity crystalline dextrose, by which is intended a dextrose or grape sugar having a purity of from 99% to 100% purity and consisting of separate and naturally formed granules of crystalline structure, which, however, need not be individual crystals in the strict sense of the term, but may include twins and parallel growths and other composites in the form of compact, unitary granules.

The object of the present invention is to produce hydrate dextrose of higher purity than has heretofore been obtainable, by the method of crystallization in motion, that is by the use of a slow moving agitator in the crystallizer which keeps the solid phase dispersed in the liquid, but without the use of seed crystals, either dry seed or foots; and this is accomplished by employing dextrose solutions of a high degree of purity—96% to 100% reducing sugar calculated as dextrose on dry substance basis—at relatively low gravities, i. e. from 36° to 38° Baumé, densities being based on a temperature of 100° F. as is customary in this industry.

As an example: a dextrose solution of 97% purity prepared, for instance by melting solid dextrose of that purity, is concentrated for example by heating in a vacuum pan to 37° Baumé and cooled, (for example, in a cooling vessel having a pipe coil through which cold water is circulated), to a temperature of about 100° F. and is then introduced into a crystallizer of the type commonly used for crystallizing dextrose provided with a slowly revolving agitator, in which the solution is allowed to cool gradually, ordinarily without circulation of water through the jacket of the crystallizer, until a temperature of about 95° F. is reached. The initial treatment in the cooling vessel brings about a relatively rapid reduction of temperature through the temperature range favorable to crystallization as the anhydride to a temperature favorable to the production of the hydrate. During the last stages of the crystallizing operation, that is, after a considerable body of solid phase has been built up, consisting exclusively, or substantially so, of hydrate crystals, water may be circulated through the jacket to hasten the temperature drop down to 85° F. for example.

At the end of the crystallizing operation the massecuite is purged of its mother liquor and washed in centrifugal machines in the usual manner. During the crystallizing operation, the agitator is kept in movement.

The high purity of the solution would naturally bring about the formation of anhydrous crystals and to some extent this apparently takes place. However, the low gravity of the solution is a factor tending to produce crystallization as the hydrate and as the temperature is reduced, which also favors the formation of the hydrate, conditions definitely favoring the production of the hydrate are reached before any considerable amount of anhydrous crystals are produced. The continuance of crystallization, for a considerable period of time, under these dominant hydrate conditions brings about a change of the anhydrous crystals, such as may be produced in the early stages, into hydrate so that toward the end of the crystallization period, which may be continuous for from 48 to 72 hours, the massecuite will consist wholly, or substantially so, of hydrate crystals of characteristic configuration. The crystals however are considerably longer than the normal hydrate crystals produced for example in accordance with the processes of patents to W. B. Newkirk No. 1,471,347, dated October 23, 1923 and No. 1,521,830, January 6, 1925, being sometimes three times as long. The sugar in bulk is light, fluffy and silky. The crystals can be made more nearly normal in length by the use of foots as described in Patent No. 1,521,830. According to the present method, however, the use of neither foots nor dry crystals, as seed, is essential.

As high purity tends to bring about crystallization as the anhydride, it is advisable to employ densities in inverse proportion to purities, within the ranges of destiny and purity specified.

A similar effect can be obtained by control of temperatures. If the purity of the solution is high, the predominance of hydrate conditions can be brought about by a rapid cooling of the liquor to temperature within the hydrate range. In order to obtain satisfactory yield, it is desirable that the density of the liquid be as high as possible under the circumstances.

It will be obvious that it is impossible to describe all workable modifications as the methods of these inventions, the principles of which, however, will be readily understood by those skilled in the art from the above description of a specific example. It is my intention to claim all modifications within the scope of the appended claims.

Because the dextrose is crystallized from a solution of higher purity than has been heretofore customarily used for the production of the hydrate, the product will contain an even smaller quantity of impurities. In fact the impurities may be reduced to practically nothing.

I claim:

1. Method of making high purity hydrous dextrose consisting of separate naturally formed granules of crystalline structure from starch converted dextrose solutions in accordance with which a dextrose solution having a purity of between 96% and 100% and a density of between 36° and 38° Baumé is supersaturated at a temperature favorable to crystallization of the hydrate while being given a slow agitation to keep the solid phase dispersed in the liquid.

2. Method of making high purity hydrous dextrose consisting of separate naturally formed granules of crystalline structure from starch converted dextrose solutions in accordance with which a dextrose solution having a purity of between 96% and 100% and a density of between 36° and concentrated by heating to 38° Baumé is supersaturated and supersaturation maintained by cooling to a temperature favorable to crystallization of the hydrate while the massecuite is given a slow agitation to keep the solid phase dispersed in the liquid.

3. Method of making high purity hydrous dextrose consisting of separate naturally formed granules of crystalline structure from starch converted dextrose solutions in accordance with which a dextrose solution having a purity of approximately 97% and a density of approximately 37° Baumé is supersaturated at a temperature below 100° F. while being given a slow agitation to keep the solid phase dispersed in the liquid.

4. Method of making high purity hydrous dextrose, consisting of separate naturally formed granules of crystalline structure, from starch converted dextrose solutions, which comprises concentrating by heat a solution having a purity of between 96% and 100% to a density of from 36 to 38° Baumé, artificially cooling the solution to approximately 100° F. and then allowing the liquor to cool to a temperature between 95° F. and 85° F. without seed crystals and with slow agitation keeping the solid phase as formed dispersed in the liquid, to bring about crystallization.

5. Method of making high purity hydrous dextrose, consisting of separate naturally formed granules of crystalline structure, from starch converted dextrose solutions, which comprises concentrating by heat a solution having a purity of between 96% and 100% to a density of from 36° to 38° Baumé, artificially cooling the solution to approximately 100° F., allowing the liquor to cool, with slow agitation keeping the solid phase as formed dispersed in the liquid to a temperature of about 95° F. to bring about crystallization and toward the end of the crystallizing period further reducing the temperature to about 85° F.

6. The method of making high purity hydrous dextrose consisting of separate naturally formed granules of crystalline structure from starch converted dextrose solutions in accordance with which a dextrose solution having a purity of approximately 96% to 100% and a density of approximately 36° to 38° Baumé is concentrated by heating to a temperature favorable to crystallization of the anhydride, is then artificially cooled to temperatures favorable to the crystallization of the hydrate and thereafter allowed to cool naturally while being given slow agitation to keep the solid phase dispersed in the liquid.

7. Method of making high purity hydrous dextrose consisting of separate naturally formed granules of crystalline structure from starch converted dextrose solutions in accordance with which a dextrose solution having a purity of approximately 96% to 100% and a density of approximately 36° to 38° Baumé is concentrated by heating to a temperature favorable to crystallization of the anhydride, is then artificially cooled to temperatures favorable to the crystallization of the hydrate, thereafter is allowed to cool naturally while being given slow agitation to keep the solid phase dispersed in the liquid, and finally is artifically cooled to u lower temperature.

WILLIAM B. NEWKIRK.

CERTIFICATE OF CORRECTION.

Patent No. 1,890,913.   December 13, 1932.

WILLIAM B. NEWKIRK.

It is hereby certified that error appears in the printed specification of the above numbered patent requiring correction as follows: Page 2, lines 40 and 41, claim 2, strike out the words "concentrated by heating to" and insert the same after the word "and" second occurrence in line 39; and that the said Letters Patent should be read with this correction therein that the same may conform to the record of the case in the Patent Office.

Signed and sealed this 14th day of February, A. D. 1933.

(Seal)

M. J. Moore,
Acting Commissioner of Patents.